(12) United States Patent
Bortolussi et al.

(10) Patent No.: US 11,185,019 B2
(45) Date of Patent: Nov. 30, 2021

(54) SUPPORT DEVICE FOR A CARRYING WIRE OF A ROW OF PLANTS ON A SUPPORT POLE

(71) Applicants: Franco Bortolussi, Fiume Veneto (IT); Claudio Bortolussi, Fiume Veneto (IT)

(72) Inventors: Franco Bortolussi, Fiume Veneto (IT); Claudio Bortolussi, Fiume Veneto (IT)

(*) Notice: Subject to any disclaimer, the term of this patent is extended or adjusted under 35 U.S.C. 154(b) by 404 days.

(21) Appl. No.: 16/075,758

(22) PCT Filed: Feb. 24, 2016

(86) PCT No.: PCT/IT2016/000046
§ 371 (c)(1),
(2) Date: Aug. 6, 2018

(87) PCT Pub. No.: WO2017/145184
PCT Pub. Date: Aug. 31, 2017

(65) Prior Publication Data
US 2019/0075737 A1    Mar. 14, 2019

(51) Int. Cl.
*A01G 17/04* (2006.01)
*A01G 17/08* (2006.01)
(Continued)

(52) U.S. Cl.
CPC .......... *A01G 17/06* (2013.01); *A01G 17/04* (2013.01); *A01G 17/08* (2013.01); *A01G 17/10* (2013.01);
(Continued)

(58) Field of Classification Search
CPC ........ A01G 17/04; A01G 17/06; A01G 17/08; A01G 17/10; A01G 2017/065
(Continued)

(56) References Cited

U.S. PATENT DOCUMENTS

| 997,022 A | * | 7/1911 | Tennant et al. ........ A01G 17/06 47/46 |
| 3,800,365 A | * | 4/1974 | Bruggert ................ F16B 2/248 47/47 |

(Continued)

FOREIGN PATENT DOCUMENTS

| EP | 0072420 A1 | 2/1983 |
| FR | 2650726 A1 | 2/1991 |

(Continued)

OTHER PUBLICATIONS

Apr. 11, 2016 International Search Report issued in Patent Application No. PCT/IT2016/000046.
(Continued)

*Primary Examiner* — David J Parsley
(74) *Attorney, Agent, or Firm* — Oliff PLC

(57) ABSTRACT

A support device, or hook, for removably securing movable wires on a row of plants, such as for example a vineyard or an orchard, on a support pole. In particular, the support device is made up of an elastically deformable filiform body, shaped in such a manner as to have at least engagement elements adapted to elastically cooperate with an opening provided on the support pole to removably secure the support device on the support pole, and support elements, adapted to elastically cooperate with the external surface of the support pole to removably receive the wire, wherein the engagement elements and the support elements are formed by portions of the filiform body lying on planes essentially orthogonal to each other.

16 Claims, 11 Drawing Sheets

(51) Int. Cl.
    *A01G 17/10*     (2006.01)
    *A01G 17/06*     (2006.01)
    *E04H 17/10*     (2006.01)
    *F16G 11/12*     (2006.01)

(52) U.S. Cl.
    CPC ........ *A01G 2017/065* (2013.01); *E04H 17/10* (2013.01); *F16G 11/12* (2013.01)

(58) Field of Classification Search
    USPC ....................................................... 47/44, 46
    See application file for complete search history.

(56) References Cited

U.S. PATENT DOCUMENTS

| | | | | |
|---|---|---|---|---|
| 4,099,299 A * | 7/1978 | Bruggert | ............... | A01G 17/08 24/336 |
| 4,201,013 A * | 5/1980 | Robbins | ................. | A01G 9/12 24/546 |
| 5,501,035 A * | 3/1996 | Downer | ................. | A01G 17/06 256/57 |
| 5,916,028 A * | 6/1999 | Downer | ................. | A01G 17/06 248/218.4 |
| 6,293,521 B1 | 9/2001 | Parrish | | |
| 6,973,751 B2 * | 12/2005 | Pierce, Jr. | ............. | A01G 17/06 47/46 |
| 8,935,878 B2 * | 1/2015 | Brusco | ................. | A01G 17/06 47/45 |
| 2010/0107490 A1 * | 5/2010 | Martin Alvarez | ..... | A01G 17/06 47/46 |

FOREIGN PATENT DOCUMENTS

| | | |
|---|---|---|
| FR | 2838603 A1 | 10/2003 |
| FR | 3012198 A1 | 4/2015 |

OTHER PUBLICATIONS

Apr. 11, 2016 Written Opinion of the International Searching Authority issued in Patent Application No. PCT/IT2016/000046.

* cited by examiner

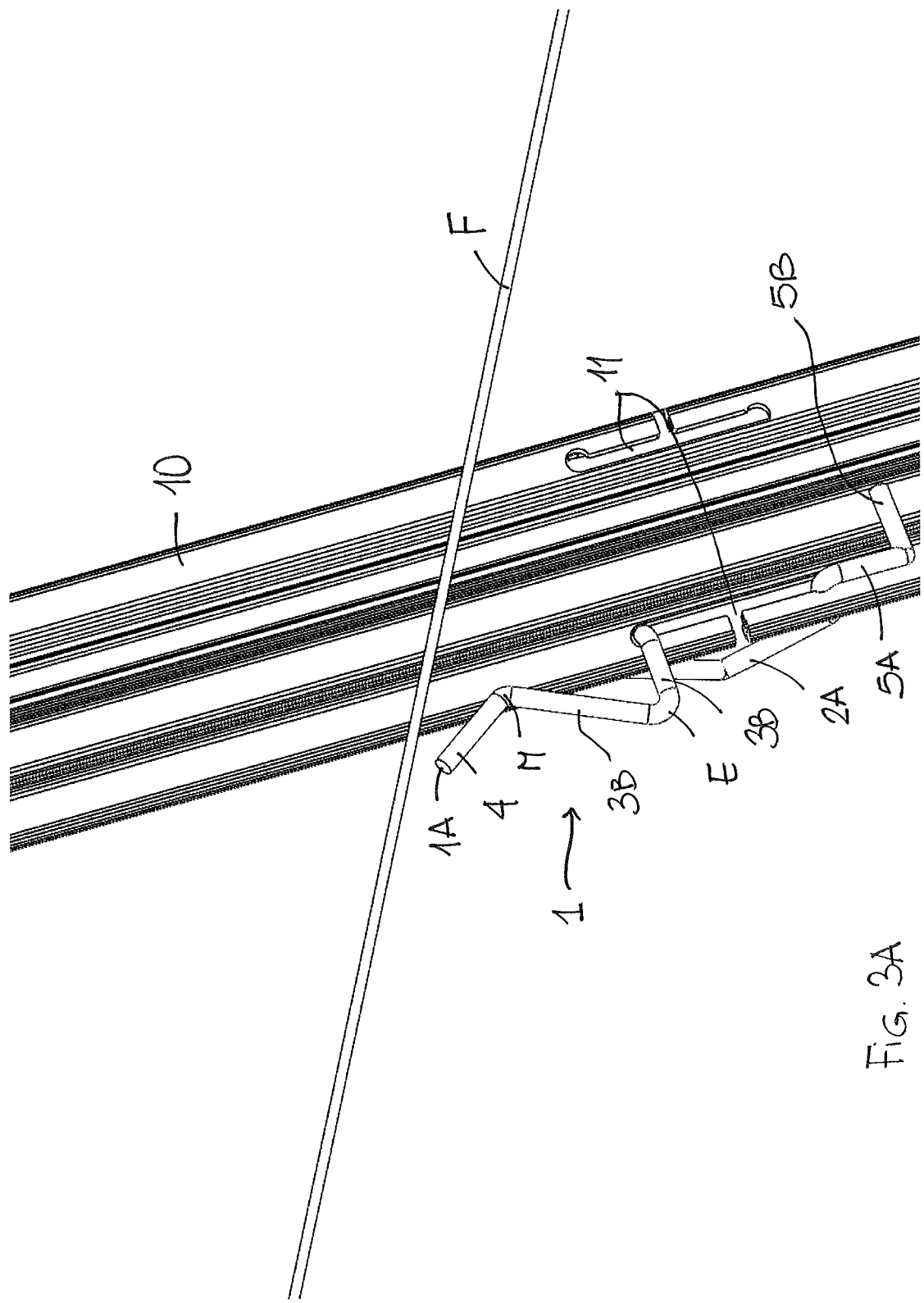

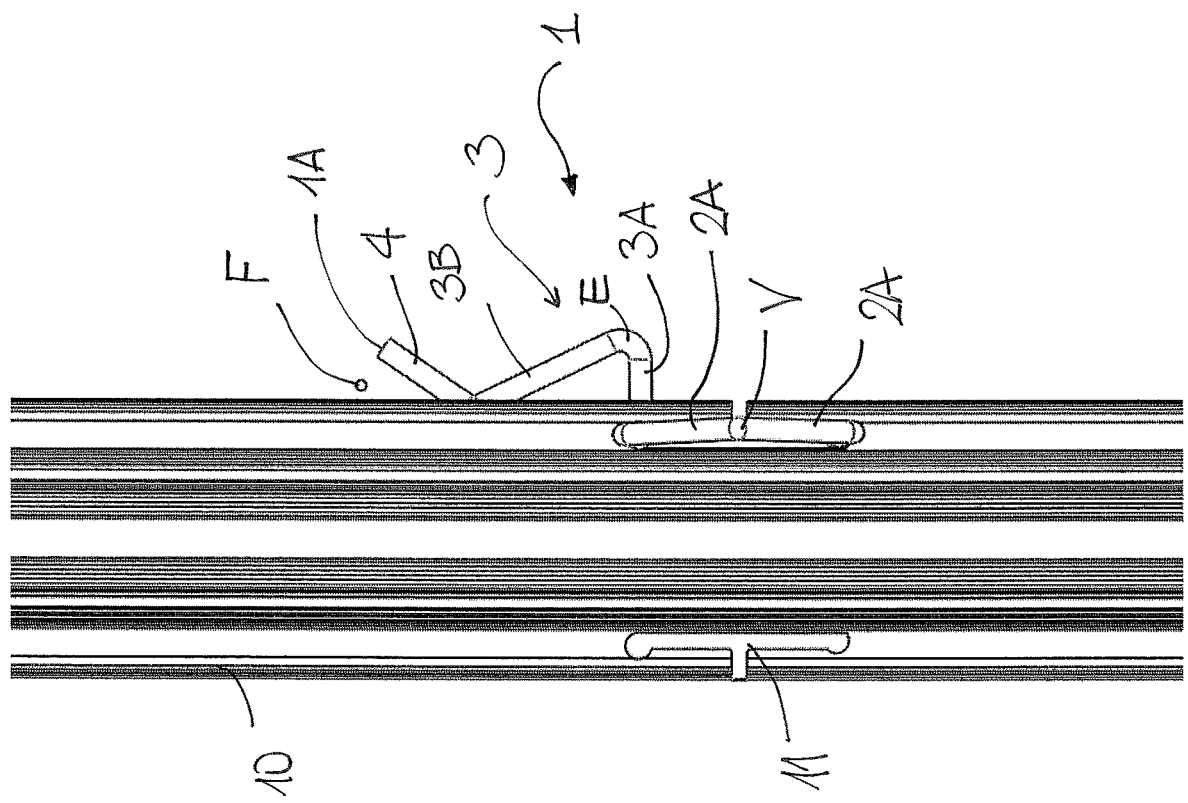

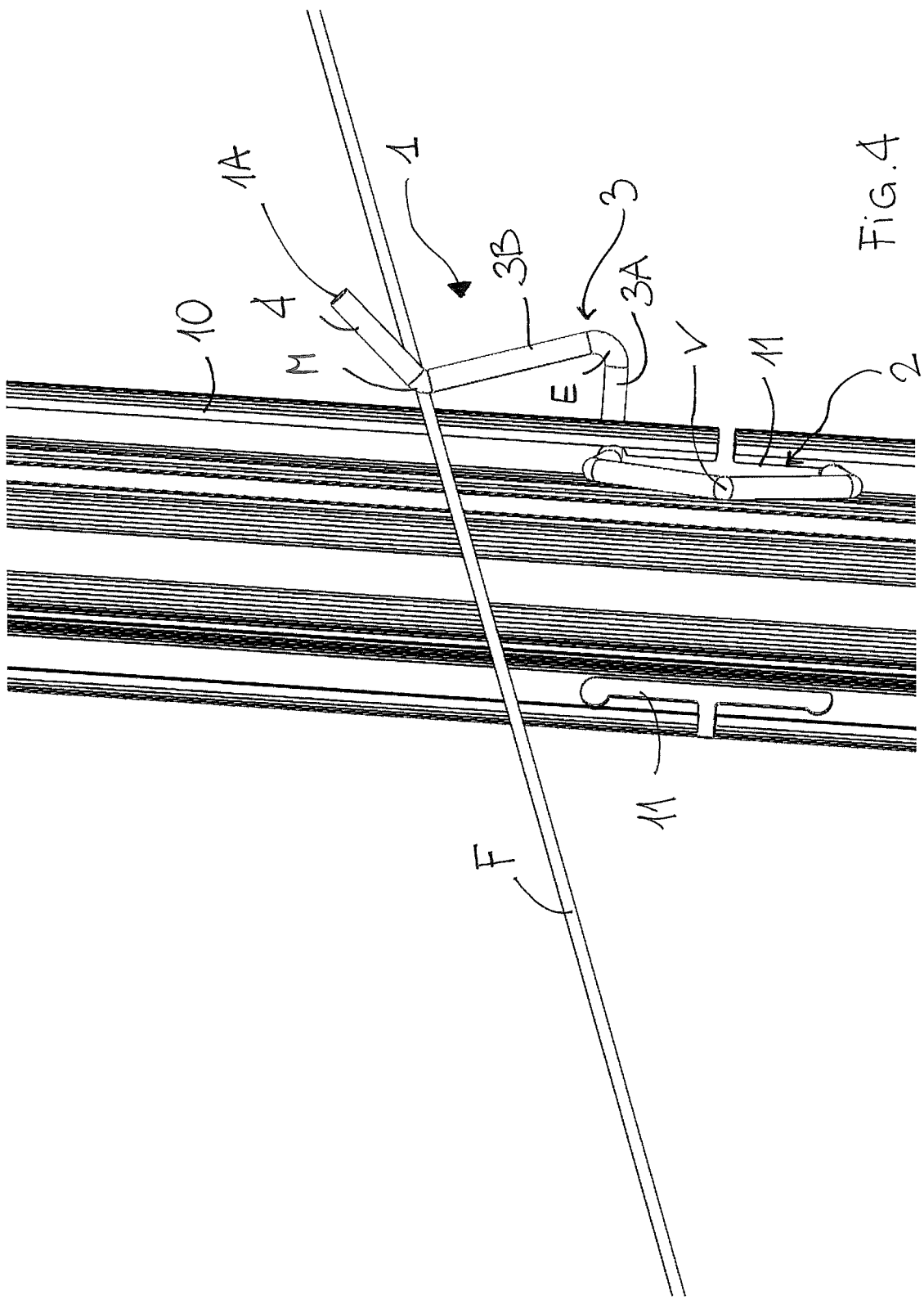

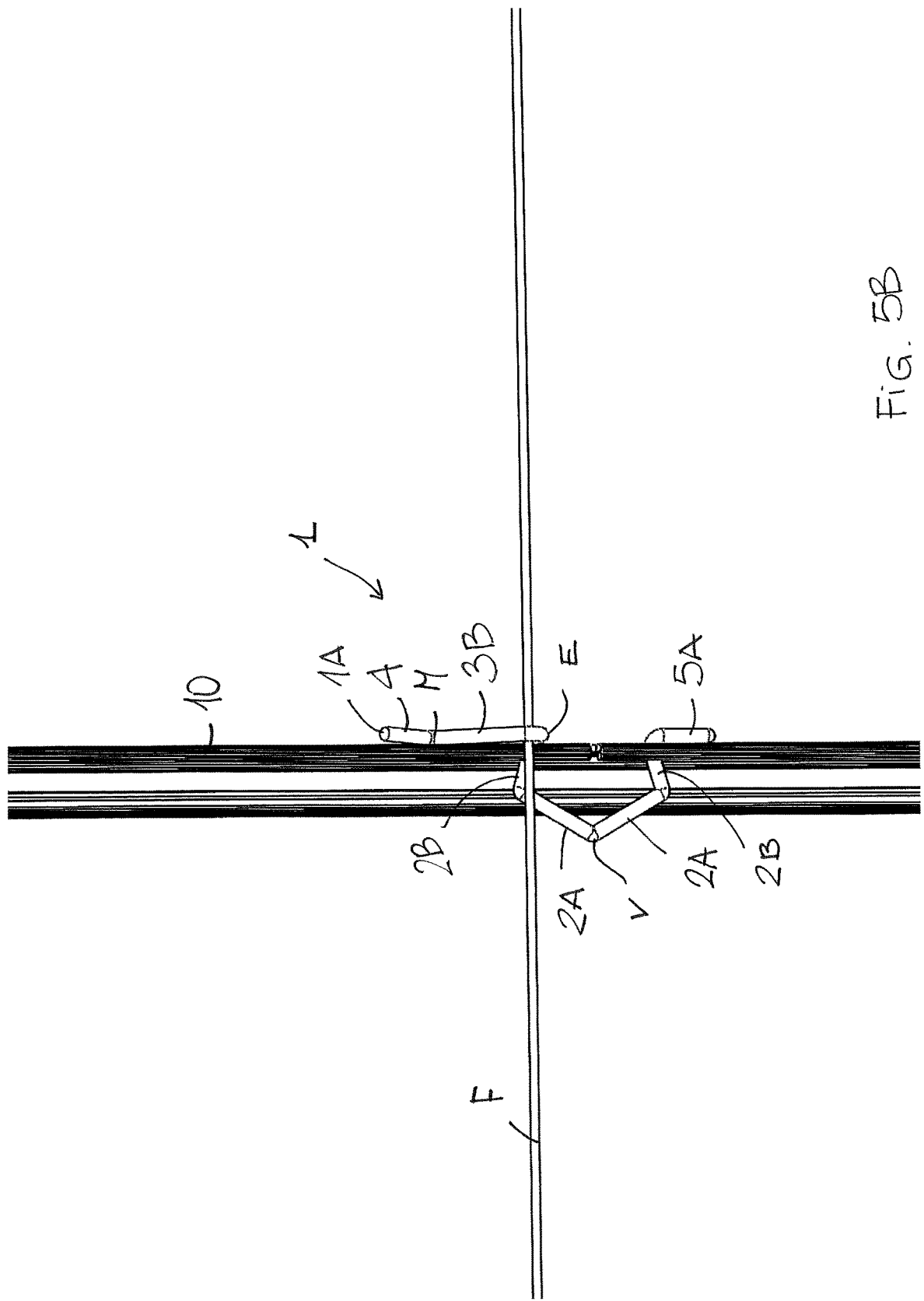

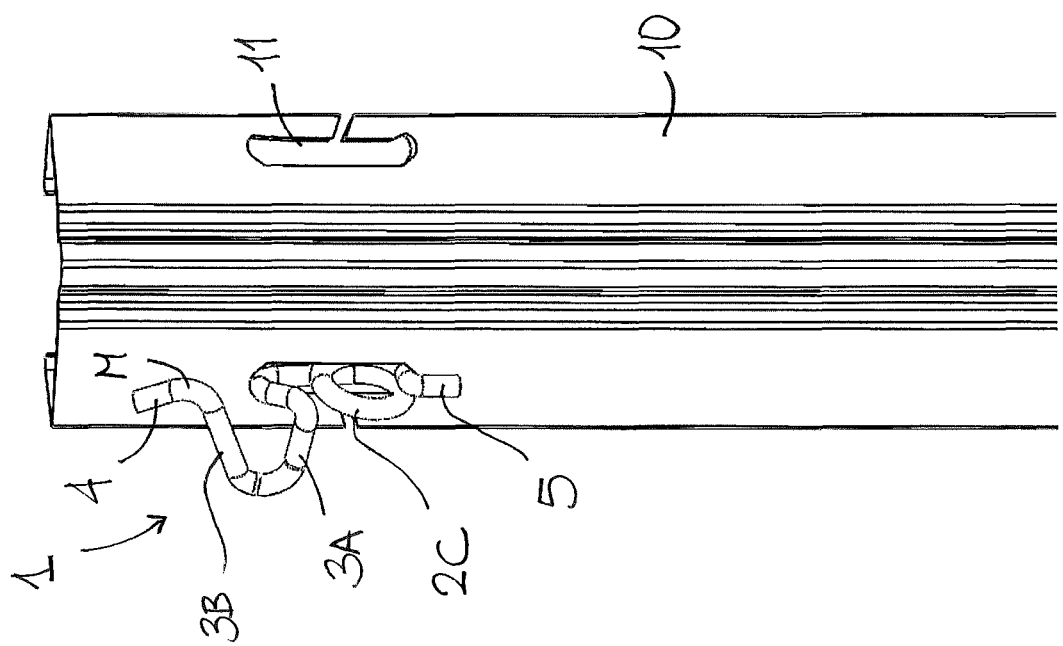

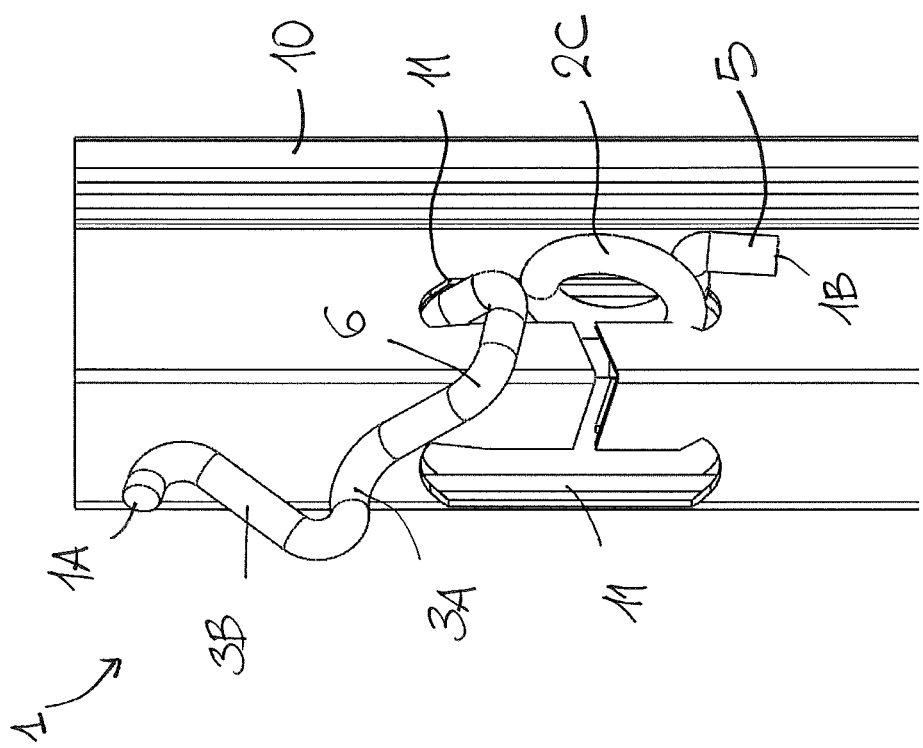

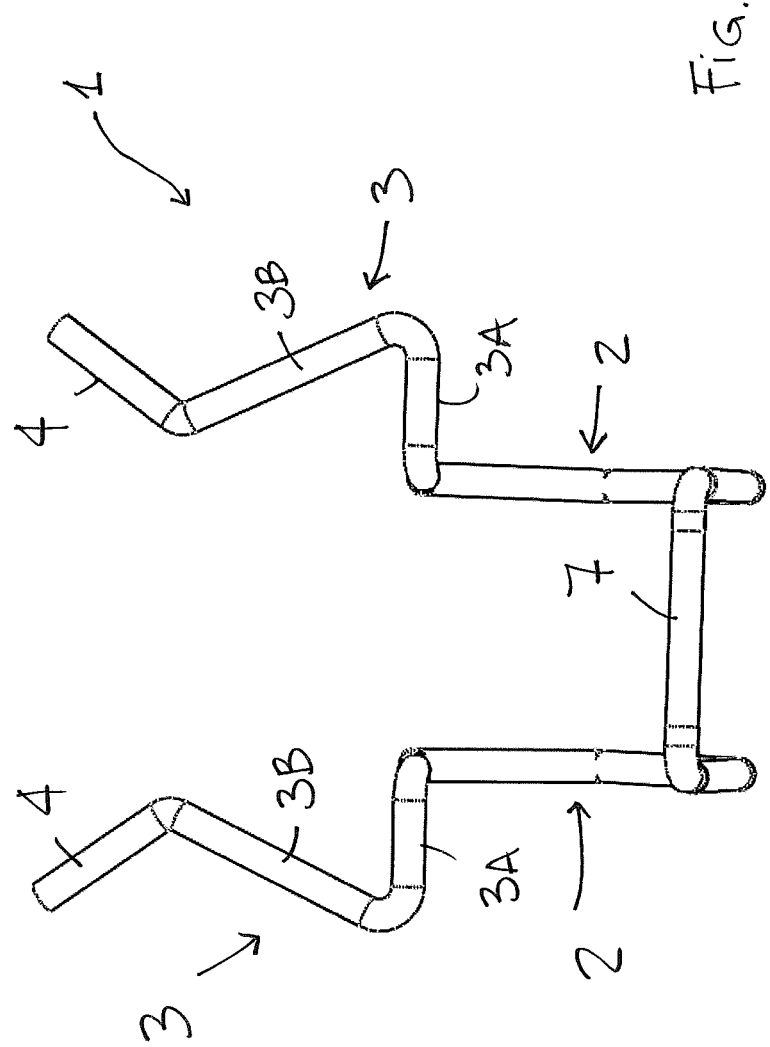

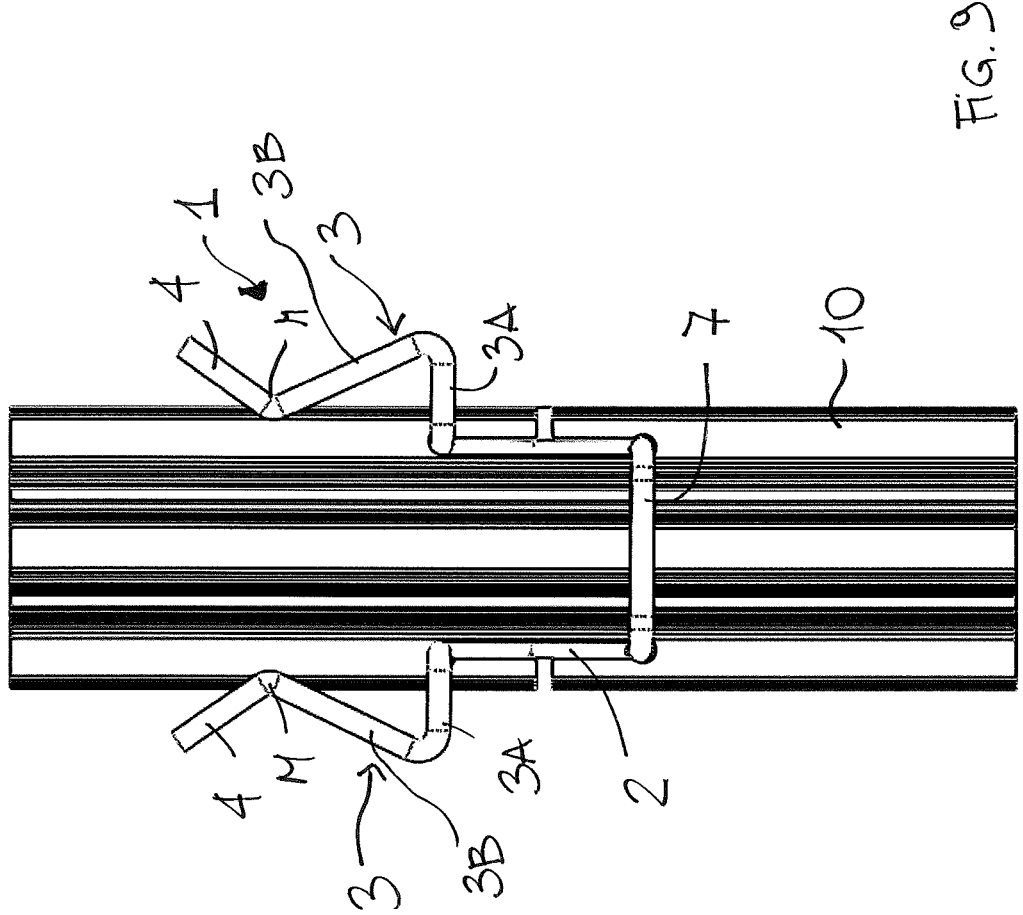

SUPPORT DEVICE FOR A CARRYING WIRE OF A ROW OF PLANTS ON A SUPPORT POLE

TECHNICAL FIELD OF INVENTION

The present invention refers to a support device, or hook, for removably securing movable wires on a row of plants, such as for example in a vineyard or an orchard, on a support pole.

BACKGROUND OF THE INVENTION

In agriculture, and particularly in the grape-growing field, a well-known practice is to prearrange plant support structures consisting of rows of poles driven into the ground to form rows of plants. The poles are spaced apart from each other and are interconnected in their parts above ground by a horizontal wire, called "carrying wire", that is secured on said poles at a adapted height above the ground.

On two poles located at the ends of each row, called "head poles", are also secured at least one pair of wires parallel to each other and arranged tangentially to the respective sides of each pole in the row, commonly called "containment wires" or "movable wires" because, during the different phases of cultivation of the plants, they are moved to different heights above the ground to contain and arrange the growing vegetation according to a desired configuration.

On the intermediate poles in the row, included between the head poles, are suitably provided supports, or hooks, for temporarily securing the movable wires at one or more levels above the ground.

In the winter season, when the vine shoots are very short or are completely absent, the pairs of movable wires are arranged in a position closer to the ground. In the spring and summer seasons, when the plants are in full growth, each pair of movable wires is progressively moved to a position farther from the ground in the direction orthogonal to the ground, to restrain the vegetation between the wires of each pair, thus making it grow according to a desired configuration and guaranteeing the growing canopy and the fruit the best possible exposure to the sun and the air, while facilitating the processes involved.

The displacement of the containment wires, or the unfastening of the movable wires previously secured at a first height above the ground and their subsequent refastening at a different height, can be carried out either manually or mechanically, using adapted equipment that are particularly advantageous in the case of extensive vineyards, in which the plants in the rows can be counted in thousands.

Historically, the support poles used in the vineyards were wooden stakes; consequently, it was rather easy to attach on them, at the desired heights, the support devices for temporarily securing the movable wires. For requirements of strength and uniformity, the wooden poles have been progressively replaced with metal poles, in particular made of zinc-plated steel, of various shapes and cross sections, such as for example round, square, polygonal, or also with a T-shaped or open cross section.

Similarly, the wires strung between the poles, that once were also zinc-plated steel, have gradually given way to stainless steel wires studied specifically for application in the viticultural field.

In the case in which the poles of the rows have an open cross section, the French Patent FR2838603 illustrates a temporary movable wire support device made of spring steel wire suitably bent to define an elastic engagement portion such as to be elastically inserted into the cavity defined by the pole, and a coupling portion, adapted to project from the external surface of the pole to form essentially a support hook in which the containment wire can be inserted.

Although such support elements perform satisfactorily when used to build enclosures, in which they are only required to support the weight of the wires, they are not reliable if used as supports for the containment wires of a vineyard, since the weight of the fruit and the foliage, especially in the stage of maximum growth, can be quite considerable and lead to the likelihood that the support device slides inside the pole and to the consequent functional loss of the entire cultivation system.

Moreover, not all open cross section poles allow the use of spring wire within their cavity since they do not have adequate undercuts in which the engagement portions of the support elements can be elastically lodged.

Alternatively, metal poles have been proposed in which the support hooks for the movable wires are obtained directly on the shaft of the same; in particular, on the edges of the pole, and at desired heights, are obtained pairs of "notches", defined by through openings, distributed along the height of the pole and suitably shaped to substantially form support grooves in which respective portions of movable wires can be held temporarily.

To prevent the possibility that accidental oscillatory movements of the movable wires cause their exit from the groove, the openings can have an oblique lead-in entrance, or the support grooves can define adapted undercuts; thus the movement for inserting and extracting the portions of movable wires involved must be carried out with operations that are rather complicated to perform in a synchronized manner, especially if the displacement of the containment wires is carried out with the use of mechanical equipment.

Moreover, since such openings are generally made by laser cutting or shearing, the edges of the same can be quite sharp, even managing to break the steel wires during their handling.

To overcome such drawbacks, the French Patent Application FR3012198 describes a support device adapted to cooperate with the openings made on the shaft of said pole for temporarily securing a containment wire. Such support device is obtained essentially from an elastically deformable wire, curved in space to define two S-shaped portions substantially symmetrical with respect to a vertical plane of symmetry, connected by a linking portion lying on a plane substantially perpendicular to the plane of symmetry. In this manner, the support device obtained in this way has elasticity both along the directions perpendicular to said vertical plane of symmetry, and also along directions parallel to the same plane.

The portions proximate to the free ends of the wire forming the support device are adapted to be elastically inserted into an opening provided on the shaft of the pole, while the portions proximate to the connecting portions of the same are arranged projecting from the external surface of the pole so as to form a sort of hook in which is slidably inserted the containment wire and elastically held temporarily therein thanks to the shape of the support device.

One drawback found in the use of such support elements stems from the fact that the elastic portion that is inserted into the pole through the openings provided on the shaft holds the whole support device, bearing exclusively on the edges that define the same opening; this could fail to offer a sufficient degree of safety against the accidental rotation of the support device, caused for example by impacts with the arms of the devices that move the movable wires or by the action of the wind on the vegetation, which would easily cause the exit of the device from the respective opening.

Moreover, in winter, when the containment wires are positioned at a height closer to the ground, it would be advisable to orientate the portion forming the hook in such a manner as to have the concave part turned downward, so as to avoid the possibility of the wires accidentally changing their position along the shaft of the pole and hindering the growth of the vegetation. Clearly, with the hooks shown in the above-mentioned patent this would not be possible.

In the scope of the above objective, one purpose of the present invention is to overcome the drawbacks of the prior art by proposing a support device for temporarily securing movable wires on intermediate poles on rows of plants, said wires and said pole being reciprocally and substantially oriented perpendicularly to each other, said device being simple to achieve and to install but at the same time offering an optimal support of the wires on a pole, compared to known devices, preventing the device from coming out or the wire from sliding in the direction of prevalent extension of the pole, remaining firmly secured in the desired position.

A further objective of the present invention is to achieve a device for the temporary support of elongate elements that can be easily removed and repeatedly used without losing its effectiveness.

A still further objective of the present invention is to provide a support device for temporarily securing movable wires that guarantees maximum usage flexibility, that can be associated to poles having an open cross section of various geometries and being provided with openings of different shapes, also allowing it to be positioned in the most appropriate manner based on requirements.

One not minor objective of the present invention is to provide a support device that achieves the above objective and purposes at competitive production costs, such that its use is also advantageous from the economic point of view, and that can be produced with the usual known plants, machinery and equipment.

The above objective and purposes, along with others that will become more evident below, are achieved by a device for supporting movable wires as defined in claim 1.

BRIEF DESCRIPTION OF THE FIGURES

Advantages and characteristics of the invention will be evident from the description which follows, by way of non-restrictive example, with reference to the enclosed figures, wherein:

FIGS. 3A and 3B illustrate, according to perspective views at different angles, a support device according to the present invention associated to a support pole of a row of plants, and a movable containment wire in a position extracted from the seat defined at the support device;

FIG. 4 illustrates, in a perspective view, a support device according to the present invention associated to a support pole, and a movable containment wire in a step of insertion into the seat defined by the support device;

FIGS. 5A and 5B illustrate, according to perspective views at different angles, a support device according to the present invention associated to a support pole on a row of plants, and a movable containment wire in a position inserted into the seat defined by the support device;

FIGS. 6 and 7 illustrate, with perspective views, a support device according to a variant embodiment of the present invention, when applied to a support pole on a row of plants;

FIG. 8 illustrates, in a perspective view, a further variant embodiment of a support device according to the present invention, and FIG. 9 illustrates the support device of FIG. 6 when applied to a support pole.

DETAILED DESCRIPTION OF THE INVENTION

Figure 1A:
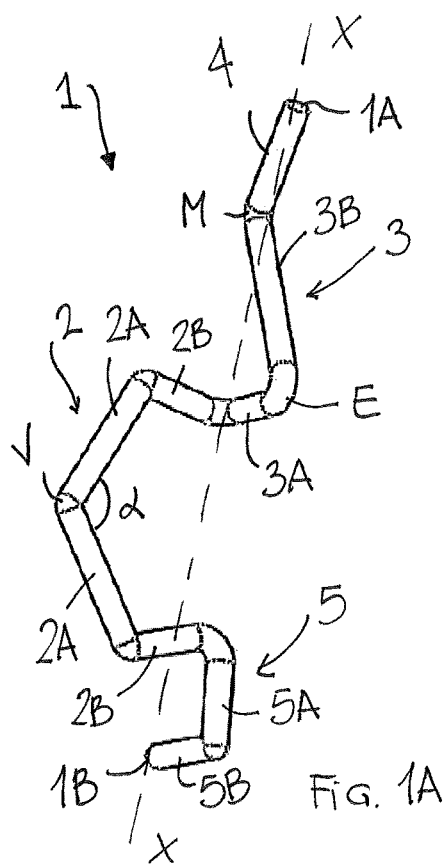
FIGS. 1A, 1B, 1C and 1D are perspective views, seen at different angles, of a support device according to the present invention.

With reference to the enclosed FIGS. 1A-1D there is illustrated a support device according to the present invention, adapted to removably secure an elongate element F, such as in particular a movable containment wire of a row of plants, on an elongate support means 10, such as for example a support pole of said row of plants, in particular an intermediate pole. In particular, said support device is adapted to secure said wire F on said pole 10 in an essentially orthogonal manner and one in contact with the other in a region where they intersect each other.

In the description which follows, terms such as "above", "below", "upper", "lower", "high", "low" and similar ones refer to a support device in its normal working arrangement, that is, in actual use, as shown in the enclosed figures.

Said support device is formed essentially by a filiform body 1 consisting of an essentially rigid and elastically deformable wire, preferably of metal material, as for example stainless steel, spring steel or zinc-plated steel.

Said filiform body 1 is appropriately shaped or bent so as to be able to perform a plurality of different functions, necessary to secure temporarily, and thus removably but reliably, a movable wire F of a row of plants on a support pole 10.

In particular, said support device is configured so as to have at least engagement means or elements 2, adapted to elastically cooperate with an opening provided on said support pole 10 to removably secure said support device on said support pole 10, and support means or elements 3, adapted to elastically cooperate with the external surface of said support pole 10 to removably receive said wire F.

Preferably, said engagement elements 2 include snap-in portions of said filiform body 1, adapted to engage an opening 11 formed on said pole 10.

Said engagement means or elements 2 and said support means or elements 3 are conceivably formed by portions of said filiform body 1 lying substantially on the same plane.

Advantageously, said engagement means or elements 2 and said support means or elements 3 are formed by portions, preferably contiguous, of said filiform body 1 lying on planes P1, P2 essentially orthogonal to each other. In other words, said filiform body 1 extends essentially on two different planes, having at least one portion lying on a first plane P1, and at least one portion lying on a second plane P2, arranged substantially perpendicular to said first plane P1, said portions being appropriately connected to each other.

According to an advantageous characteristic of the present invention, said support device 1 is provided with two opposite ends 1A, 1B, between which it extends vertically, when in actual use. In other words, the two opposite ends 1A, 16 of said filiform body 1 define substantially the longitudinal extension of said support device 1, being arranged at the extremities of the extension of the same in substantially opposite directions.

The ends 1A, 1B thus define a hypothetical axis of extension X-X shown in FIG. 1A, along which said filiform body 1 extends longitudinally, said ends 1A, 1B defining the direction of prevalent extension of said support device.

Figure 1B:
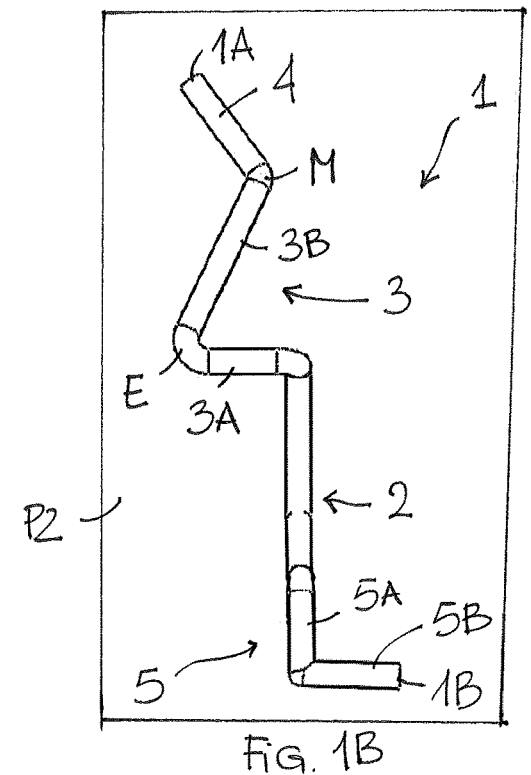
Figure 1C:
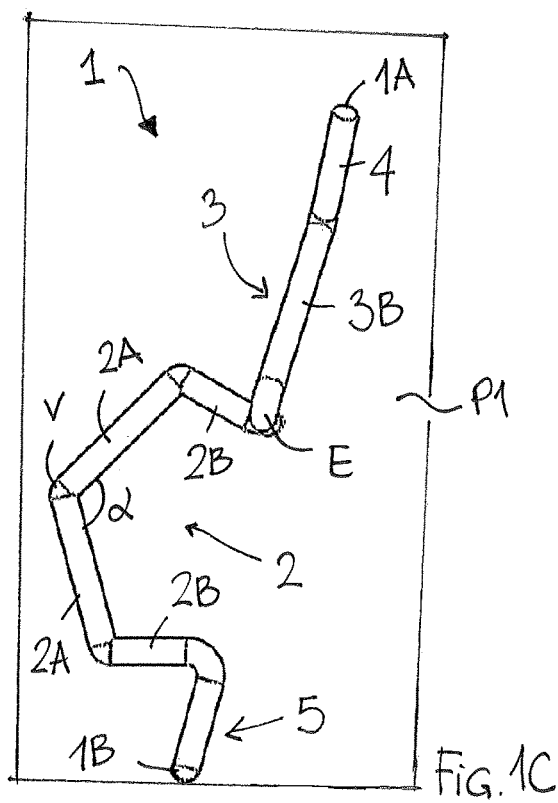

In particular, as can best be seen in FIG. 1C, said engagement means 2 are formed by a portion of said filiform body 1 having a pair of first sections 2A, having essentially the same extension, connected at respective first ends and arranged reciprocally inclined to form a first vertex V defining an internal angle α smaller than 180°; the ends of said pair of first sections 2A not connected to each other are each connected respectively to a pair of second sections 26, themselves also lying essentially on said first plane P1, which branch off from the side of the internal angle α and extend preferably essentially converging toward each other.

Thanks to this configuration, said engagement portion 2 can be easily inserted into the hole or opening of said pole 10 starting with the vertex V. Said pair of first sections 2A, arranged inclined from the first vertex V, form substantially as many inclined surfaces adapted to slidingly cooperate with the edges defining said opening, deforming elastically so as to reduce, during their insertion, the width of the internal angle α, to then snap back to the initial rest position when the edges of the opening reach said pair of second sections 2B, holding firmly the support device in the desired position on the pole 10.

Since advantageously said pair of first sections 2A has a greater extension than said pair of second sections 2B, the force required to insert them into the corresponding opening of the pole 10 as explained above is essentially less than the force necessary to extract said engagement portion 2 from said opening, with a movement in the opposite direction.

Said engagement portion 2 is preferably directly connected to a portion 3 of said filiform body 1 configured so as to define said support means 3, in particular forming a bottom section 3A that extends from the free end of one of said pair of sections 2B at right angles with respect to the lying plane P1 of said engagement portion 2.

Figure 1D:
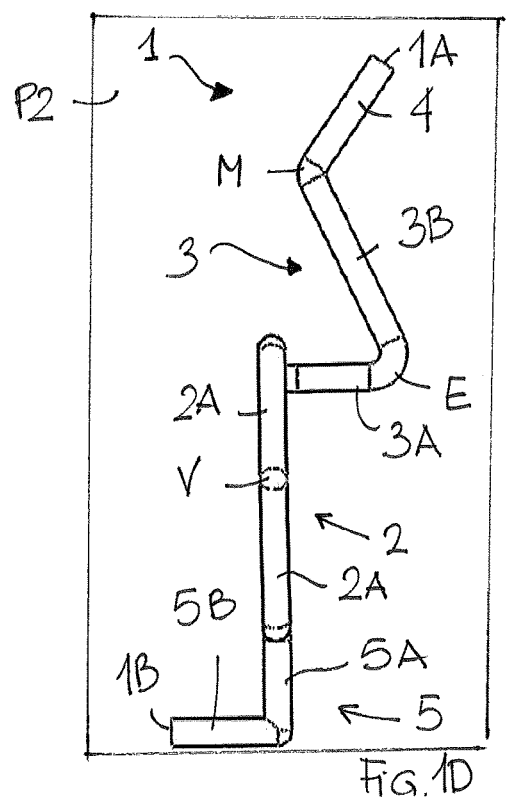

As can be better deduced from FIGS. 1B and 1D, in addition to said bottom section 3A, said support portion 3 also includes an inclined section 3B, directed connected to the end of said bottom section 3A not connected to said engagement portion 2, and itself also lying on said second plane P2, forming a second vertex E.

In particular, the end M of said inclined section 3B nearest to the upper end 1A of the filiform body 1 is adapted to be arranged, in actual use, elastically in contact with the external surface of said pole 10, in such a manner that said support portion 3, together with the external surface of the pole 10, forms a holding seat for said wire F, essentially closed but selectively openable thanks to the elasticity of said inclined section 3B.

If necessary, the end M of said inclined section 3B not connected to said bottom section 3A can be provided with lead-in means 4, defined essentially by a portion of said filiform body 1 lying on said second plane P2 and extending in an inclined direction with respect to said inclined section 3B. The free end of said lead-in portion 4 can thus coincide with the upper end 1A of said filiform body 1.

Said lead-in portion 4 is adapted to be arranged, in actual use, oriented toward the outside from the surface of said pole 10, and has essentially the function of favouring the slidable insertion of said wire F inside the holding seat defined by said support portion 3.

According to an advantageous characteristic of the present invention, said support device also includes retaining means 5 adapted, in actual use, to cooperate with the external surface of said pole 10 to firmly hold said support device 1 in position and to prevent its rotation.

Preferably, said retaining means 5 are also formed by a portion of said filiform body 1 lying along said second plane P2 and connected to said engagement portion 2 in such a manner that the engagement portion is included between said retaining portion 5 and said support portion 3.

In particular, as can best be seen in FIGS. 1B and 1D, said retaining portion 5 lies essentially on said second plane P2 and is preferably formed by a pair of sections 5A, 5B forming substantially a letter L.

Clearly, since said filiform body 1 is made up of an elastically deformable material, the portions that have been defined as essentially lying on the P1 and P2 planes refer to the support device when in actual use; in fact, when the support device is not mounted on a pole 10, the different portions can be arranged on planes slightly inclined with respect to those defined above, in such a manner as to guarantee a greater elastic hold when in actual use.

With reference to FIGS. 3A and 3B, a support device is illustrated according to the present invention, associated to an intermediate support pole 10 on a row of plants.

In particular, the support pole 10 shown in the figures is preferably metallic and of a type with an open cross section. On opposite sides of the same pole are preferably provided at least one pair of openings 11, such as in particular a pair of slots, in correspondence of which is mounted said support device to advantageously secure removably said wire F at right angles to the extension of said pole 10 in a region of mutual intersection.

Since, generally on intermediate support poles 10 in a row of plants are secured at least one pair of containment wires, parallel to each other and arranged tangentially on opposite sides of each pole 10, the pole will be provided with corresponding pairs of slots 11, arranged on opposite sides of the shaft and at the points of intersection with said containment wires F at a desired height, each being adapted to receive a corresponding support device according to the present invention.

Figure 2:
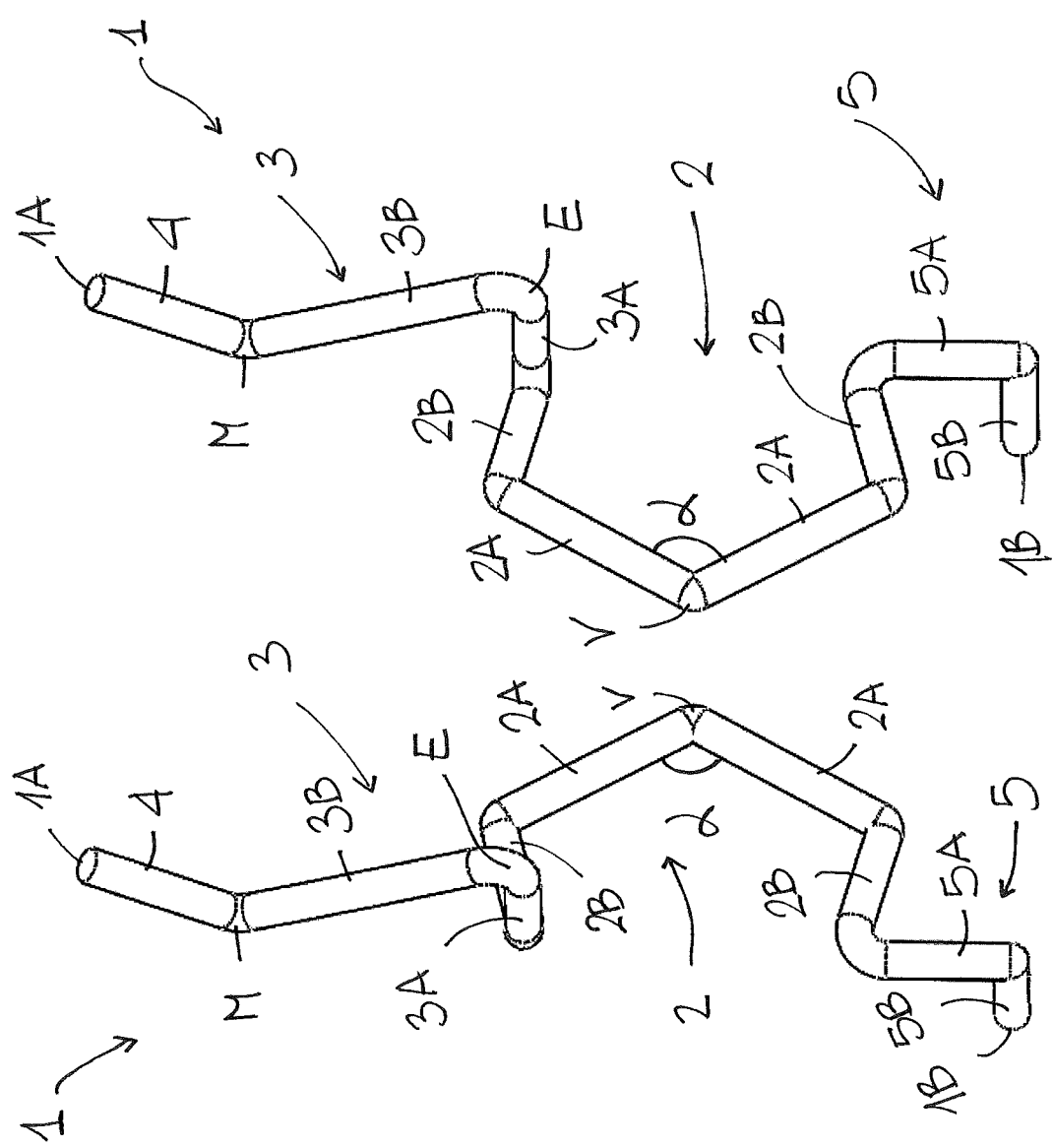
FIG. 2 illustrates, in a perspective view, a pair of support devices according to the present invention, adapted to be arranged on opposite sides of a support pole on a row of plants.
Figure 5A:
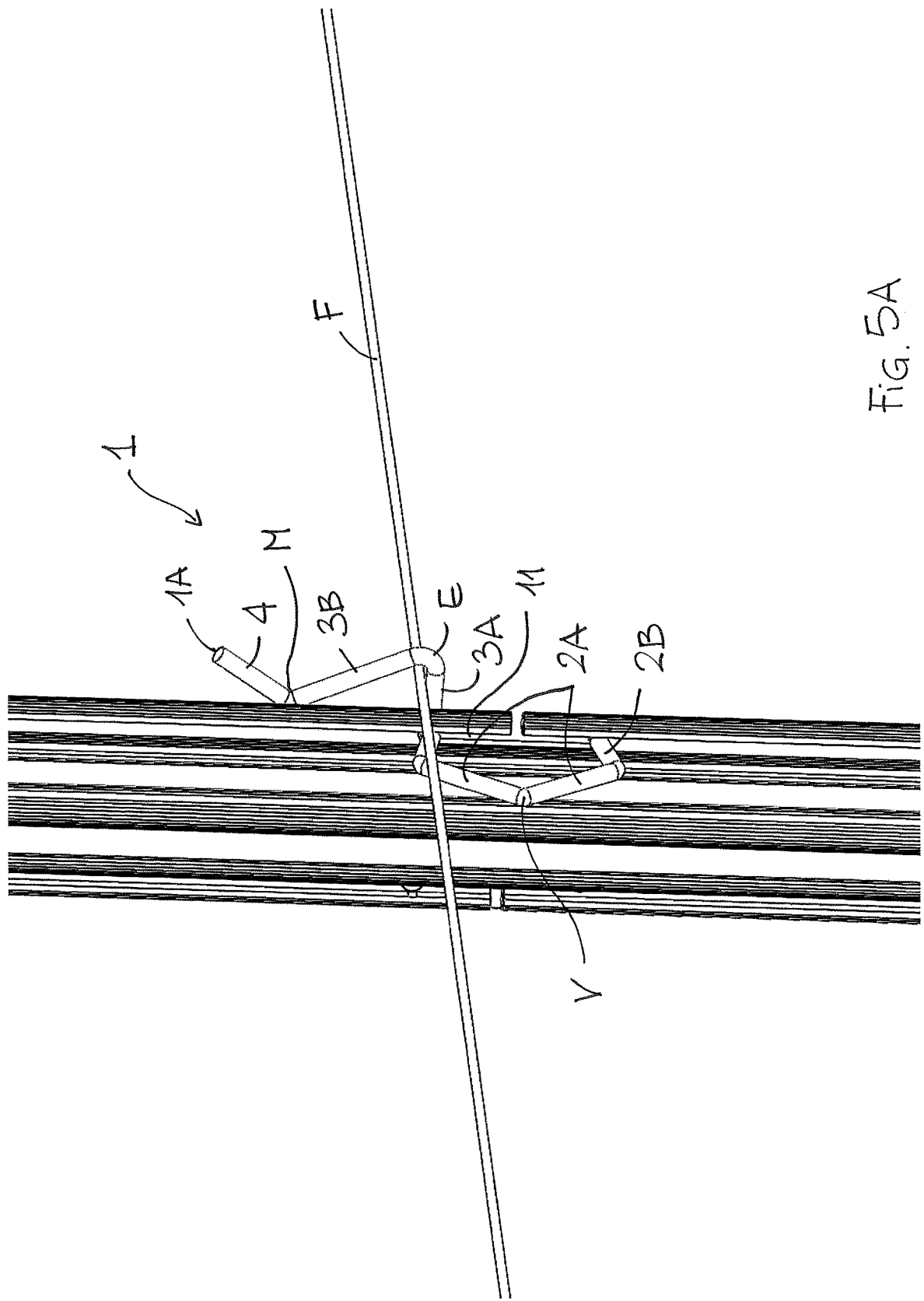

Consequently, for each pole 10 are preferably necessary pairs of support devices according to the present invention, advantageously symmetrical to each other as shown in FIG. 2, one of which being adapted to be engaged in a slotted opening 11 formed on one side of the pole 10, while the other is adapted to cooperate with the corresponding slotted opening 11 formed on the opposite side.

Alternatively, as shown in FIGS. 8 and 9, it may be advantageous to provide a pair of support devices in a single piece, adapted to be engaged inside a corresponding pair of slotted openings 11 present on opposite sides of said pole 10 and at the same height from the ground. For this reason, in this case the filiform body 1 defining a first support device is extended, by means of a connecting portion 7 that extends from the second end 1B of the same to suitably encircle the surface of the pole 10, and is subsequently shaped to define a second support device, advantageously symmetrical to the first, thus simplifying its installation and improving the holding performance.

In other words, the two symmetrical support devices are connected as one piece at their second end 1B through a bridging connecting portion 7, preferably encircling the external and rear surface of the pole 10; essentially, a first engagement means 2 and a first support means 3 are connected through a connecting portion to a second engagement means 2 and to a third support means 3 so as to be symmetrical to each other.

According to a variant embodiment of the support device, shown in FIG. 6, said engagement means 2 can be formed by a portion of said filiform body 1 shaped differently from the previously described embodiment, that is in the sense of having, in place of said pair of first sections 2A and said pair of second sections 2B, a portion with an essentially constant curvature, lying on said first plane P1 and comprising substantially a circumference 2C, preferably formed like one or more windings of a helical spring, to increase the elasticity of the engagement portion 2.

Said portion 2C comprises however at least one snap-action lead-in section adapted to engage an opening on the support pole 10.

In this case, if necessary, said retaining means 5, if provided, can lie on said first plane P1 and can be made up of a single section of the filiform body 1.

If necessary, as shown in FIG. 7, between said engagement portion 2C and said support portion 3 can be provided a further connecting portion 6, formed by said filiform body 1, and shaped so as to encircle an edge of the external surface of the pole 10. In particular, said connecting portion 6 makes it advantageously possible to prevent the wire F, when inserted, to move beyond said holding seat defined by said support portion 3 and to get trapped into the slotted opening 11 in which said engagement means 2 are held.

The installation and operation of a support device according to the present invention is explained below with reference to FIGS. 3A, 3B, 4, 5A and 5B.

In particular, the installation of the support device on a pole 10 is achieved by elastically engaging said engagement means 2 through a respective slotted opening 11, starting from said vertex V; said pair of first sections 2A arranged inclined from the first vertex V form substantially as many inclined surfaces adapted to slidingly cooperate with the edges defining said opening 11, becoming elastically deformed in such a manner as to reduce, when being inserted, the width of the internal angle α at the vertex V, and to then snap back to the initial rest position when the edges of the opening 11 reach said pair of second sections 2B.

Once said engagement means 2 are inserted into the respective slotted opening 11 as explained above, thanks to the configuration of the filiform body said support means 3 will also be arranged in the desired position, as well as said lead-in means 4 and said retaining means 5, if present.

In particular, said support means 3 are arranged so that said bottom section 3A of the portion 3 that defines them projects from the surface of the edge of the pole 10 in an orthogonal direction, radially with respect to the same, while said inclined section 3B returns, with its free end M, toward the surface of said pole 10, until it comes into contact with it.

Said retaining means 5, instead, impinge against the external surface of the pole 10, in such a manner that said support device is maintained firmly in the desired position, thus preventing any accidental rotations of the same.

Said containment wire F is thus movable between an extracted position, in which it is not supported by said support device, as shown in FIGS. 3A and 3B, and an inserted position, in which it is held in the seat defined by the support device.

The passage between said extracted position and said inserted position can be effected manually of mechanically by moving the containment wire F along the external surface of the pole 10; as shown in FIG. 4, when said wire F arrives at the free end M of said inclined section 3B, its passage elastically deforms said inclined section 3B, tending to push the end M of the same away from the surface of the pole 10.

As soon as the wire F has moved by the end M of the inclined section 3B, it will tend to elastically return to the rest position, that is, in tight contact against the external surface of the pole 10, and consequently closing again the holding seat defined by said support portion 3 and the surface of the pole 10.

If so provided, the presence of said lead-in means 4, connected to the end M of said inclined section 3B and projecting from the surface of the pole 10, makes it possible to more easily intercept the containment wires F accidentally spaced away from the pole 10.

In conclusion, from the above it is evident how the present invention achieves the initially foreseen purposes and advantages. In fact, a support device that is simple to make and install has been devised for the temporary securing of movable wires of rows of plants on intermediate poles.

Further, advantageously, a support device according to the present invention provides an improved support compared to the known devices, preventing the exit of the latter and the sliding of the wire in the direction of prevalent extension of the pole, remaining firmly secured in the desired position.

Advantageously, a temporary support device according to the present invention is easily removable from the support pole on which it is attached, allowing it therefore to be used repeatedly without losing its effectiveness.

Finally, it can be seen how a support device according to the present invention guarantees the maximum flexibility of application, as it can be associated to poles of open cross section of various geometries, also provided with openings of different shapes, and can be oriented on the basis of requirements.

Naturally, the present invention is susceptible of numerous applications, modifications or variants without thereby departing from the scope of patent protection, as defined by the appended claims. Moreover, the materials and the equipment used to implement the present invention, as well as the shapes and dimensions of the individual components, can be the most adapted to satisfy the specific requirements.

The invention claimed is:

1. A support device for a carrying wire of a row of plants on a support pole, said support device being formed by an elastically deformable filiform body, shaped in such a manner as to comprise at least:
engagement elements adapted to elastically cooperate with an opening provided on said support pole to removably secure said support device on said support pole, said engagement elements being formed by a portion of the filiform body lying entirely on a first plane, and extending between a first end and a second end, and
support elements, adapted to elastically cooperate with an external surface of said support pole to removably receive said wire, said support elements being formed by a portion of the filiform body lying entirely on a second plane, and extending between a first end and a second end,
wherein:
said engagement elements comprise snap-in portions of said filiform body adapted to engage said opening provided on said pole,
said first plane of said engagement elements and said second plane of said support elements are essentially orthogonal to each other,
said filiform body extends from a first terminal end to a second, opposite terminal end such that the first and second terminal ends are arranged on an axis along which said support device has its direction of prevalent extension, said first and second terminal ends being configured to be disposed at different positions along a length of the support pole so as to be separated from each other in a direction along the length of the support pole, and said filiform body extends in order from the first terminal end to the support elements to the engagement elements to the second terminal end such that:
said first end of the support elements is the first terminal end of the filiform body,
said second end of the support elements is directly connected to the first end of the engagement elements, and
said second end of the engagement elements is the second terminal end of the filiform body or is directly connected to a retaining portion that terminates at the second terminal end, said retaining portion being configured to be spaced from the support elements in the direction along the length of the support pole, the retaining portion lying entirely on said second plane of said support elements.

2. The support device according to claim 1, wherein said engagement elements and said support elements are formed by contiguous portions of said filiform body.

3. The support device according to claim 1, wherein said support elements include a bottom section connected to an inclined section that is inclined with respect to said bottom section, and is adapted to form a seat for holding said wire.

4. The support device according to claim 1, wherein said engagement elements comprise a first pair of sections arranged so as to be reciprocally inclined with respect to one another and connected at respective first ends to form a vertex, and a pair of second sections, extending from second ends of said pair of first sections in such a manner as to be essentially convergent toward each other.

5. The support device according to claim 1, wherein said engagement elements are formed by a portion with an essentially constant curvature comprising a circumference.

6. The support device according to claim 3, wherein the support elements further comprise a lead-in element formed by a portion of said filiform body extending from an end of said inclined section and lying on said second plane.

7. The support device according to claim 3, wherein said second end of the engagement elements is directly connected to the retaining portion, the retaining portion being formed by a portion of said filiform body configured so as to come in tight contact against the external surface of said support pole to prevent rotation of said support device.

8. The support device according to claim 7, wherein said retaining portion is directly connected to said engagement elements in such a manner that the engagement elements are included between said retaining portion and said support elements.

9. The support device according to claim 7, wherein said retaining portion is formed by a pair of sections arranged substantially in an L-shaped pattern.

10. The support device according to claim 5, further comprising a connecting portion formed by said filiform body between said engagement elements and said support elements, and shaped so as to encircle an edge of the external surface of said pole.

11. The support device according to claim 5, wherein said circumference is formed like one or more windings of a helical spring.

12. The support device according to claim 1, wherein a first engagement element of said engagement elements and a first support element of said support elements are connected with a first bridging connecting portion to a second engagement element of said engagement elements and to a second support element of said support elements symmetrical to the first engagement element and to the first support element.

13. A support pole comprising at least the support device according to claim 1.

14. A system for training agricultural plants comprising a plurality of support devices corresponding to the support device according to claim 1, installed on intermediate poles for supporting at least one wire carrying growing vegetation.

15. A support device for a carrying wire of a row of plants on a support pole, said support device being formed by an elastically deformable filiform body, shaped in such a manner as to comprise at least:
engagement elements adapted to elastically cooperate with an opening provided on said support pole to removably secure said support device on said support pole, said engagement elements being formed by a portion of the filiform body lying entirely on a first plane, said engagement elements comprising a pair of first sections arranged so as to be reciprocally inclined with respect to one another and connected at respective first ends to form a vertex, and a pair of second sections extending from second ends of said pair of first sections in a manner so as to be essentially convergent toward each other, and
support elements, adapted to elastically cooperate with an external surface of said support pole to removably receive said wire, said support elements being formed by a portion of the filiform body lying entirely on a second plane and including:
a bottom section that linearly extends between a first end and a second end, and
an inclined section that is inclined with respect to said bottom section and that linearly extends between a first end and a second end,
the first end of the inclined section being configured to be held elastically in contact the external surface of the pole such that the bottom section, the inclined section, and the external surface of the pole together define a holding area that is configured to hold said wire, said holding area being configured to be opened by separating the first end of the inclined section from the external surface of the support pole,
the second end of the inclined section being connected to the first end of the bottom section,
wherein:
said engagement elements comprise snap-in portions of said filiform body adapted to engage said opening provided on said pole,
said first plane of said engagement elements and said second plane of said support elements are essentially orthogonal to each other,
said filiform body extends from a first terminal end to a second, opposite terminal end such that the first and second terminal ends are arranged on an axis along which said support device has its direction of prevalent extension, said first and second terminal ends being configured to be disposed at different positions along a length of the support pole so as to be separated from each other in a direction along the length of the support pole, and
said filiform body extends in order from the first terminal end to the support elements to the engagement elements to the second terminal end such that:

said first end of the inclined section of the support elements is the first terminal end or is directly connected to a linear lead-in portion that terminates at the first terminal end, said second end of the bottom section of the support elements is directly connected to a first end of the engagement elements, and a second end of the engagement elements is the second terminal end or is directly connected to a retaining portion that terminates at the second terminal end, said retaining portion lying entirely on said second plane of said support elements.

16. A support device for a carrying wire of a row of plants on a support pole, said support device being formed by an elastically deformable filiform body, shaped in such a manner as to comprise at least:

engagement elements adapted to elastically cooperate with an opening provided on said support pole to removably secure said support device on said support pole, said engagement elements being formed by a portion of the filiform body lying entirely on a first plane, and extending between a first end and a second end, support elements, adapted to elastically cooperate with an external surface of said support pole to removably receive said wire, said support elements being formed by a portion of the filiform body lying entirely on a second plane, and extending between a first end and a second end, the second end of the support elements being directly connected to the first end of the engagement elements, the support elements including:

a bottom section that extends between a first end and a second end, the second end of the bottom section being the second end of the support elements, and an inclined section that extends from the first end of the bottom section so as to be inclined with respect to said bottom section and terminates at the first end of the support elements, the bottom section and the inclined section being configured to form a seat for holding said wire, and a retaining portion formed by a portion of said filiform body configured to contact the external surface of said support pole so as to prevent rotation of said support device, wherein:

said engagement elements comprise snap-in portions of said filiform body adapted to engage said opening provided on said pole, said first plane of said engagement elements and said second plane of said support elements are essentially orthogonal to each other, said filiform body extends from a first terminal end to a second, opposite terminal end such that the first and second terminal ends are arranged on an axis along which said support device has its direction of prevalent extension, said first and second terminal ends being configured to be disposed at different positions along a length of the support pole so as to be separated from each other in a direction along the length of the support pole, said retaining portion lies entirely on said second plane of said support elements and extends between:
a first end directly connected to said second end of said engagement elements, and
a second end that is the second terminal end of the filiform body, and the engagement elements are positioned between said retaining portion and said support elements along the axis along which the support device has its direction of prevalent extension.

* * * * *